Sept. 11, 1956
L. E. NORTON
2,762,978
SYSTEM FOR COMPARING THE AMPLITUDES OF ELECTRICAL SIGNALS
Filed Sept. 21, 1951
3 Sheets-Sheet 1
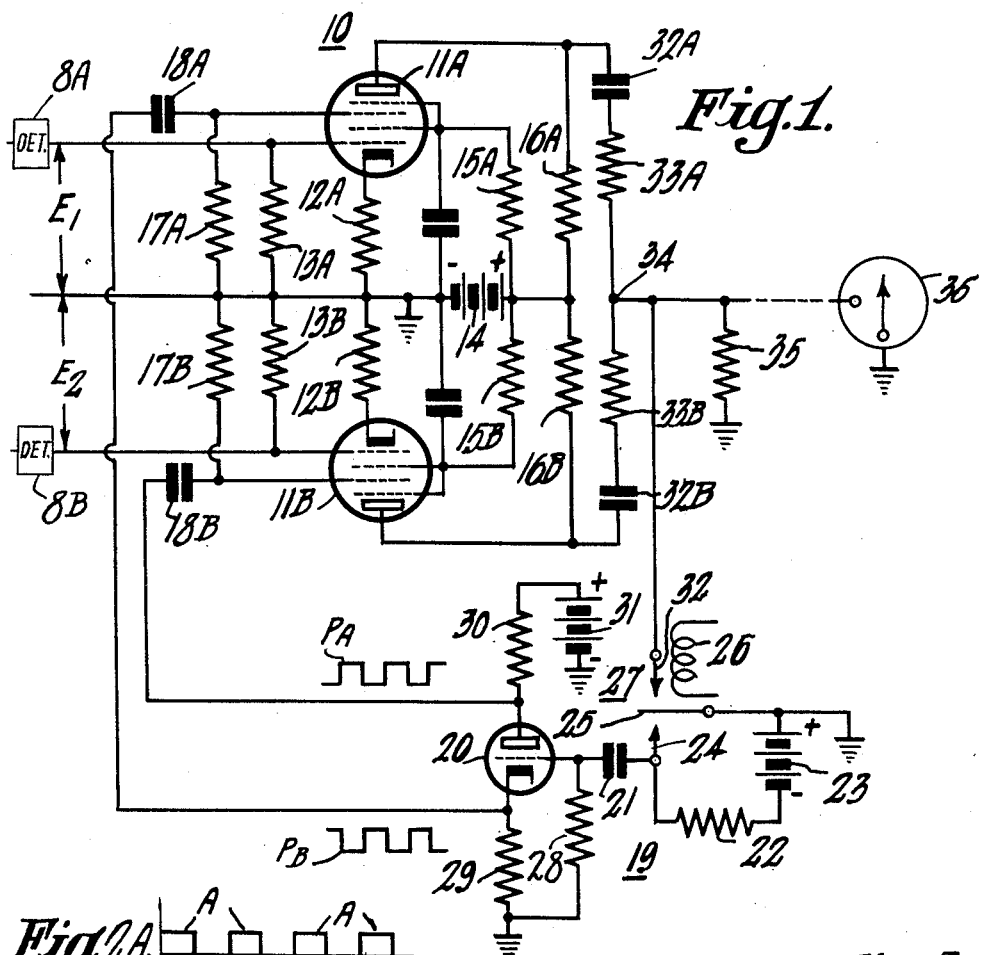
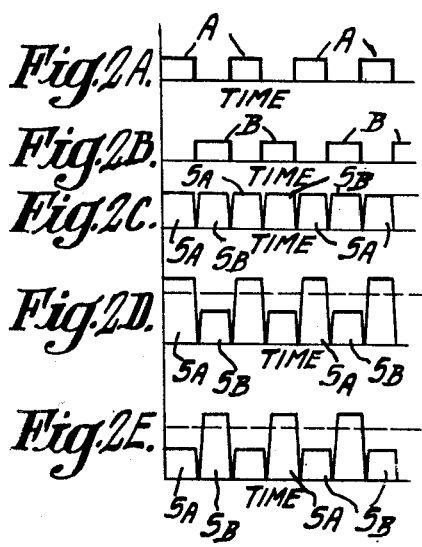
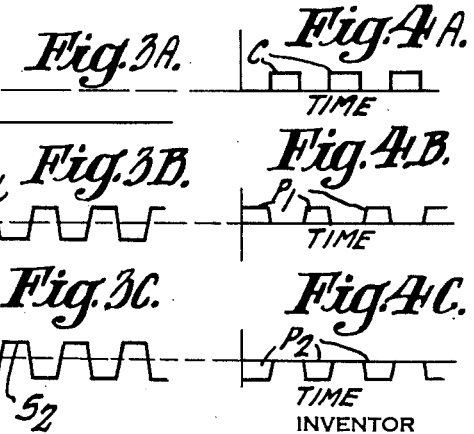
INVENTOR
*Lowell E. Norton*
BY
ATTORNEY Sept. 11, 1956         L. E. NORTON         2,762,978
SYSTEM FOR COMPARING THE AMPLITUDES OF ELECTRICAL SIGNALS
Filed Sept. 21, 1951         3 Sheets-Sheet 2

INVENTOR
Lowell E. Norton
BY
ATTORNEY

United States Patent Office 2,762,978
Patented Sept. 11, 1956

2,762,978

SYSTEM FOR COMPARING THE AMPLITUDES OF ELECTRICAL SIGNALS

Lowell E. Norton, Princeton, N. J., assignor to Radio Corporation of America, a corporation of Delaware Application September 21, 1951, Serial No. 247,685

7 Claims. (Cl. 324—140)

This invention relates to methods and arrangements for comparing the amplitudes of electrical signals and particularly to systems for effecting such comparisons with great precision.

Heretofore, the comparator circuits used for such purpose included one or two pairs of diodes carefully selected for match of their contact potentials. Even with careful selection of a pair of tubes, it is difficult to match their contact potentials to within less than a 0.25 volt differential; more often the differential voltage is several times greater than such value either initially or with continued use of the comparator. In consequence, in comparison of two signal amplitudes of approximately 10 volts, for example, the minimum error is 2.5%, which is excessive for many applications including use of spectral lines as frequency or time standards with desired frequency precision of about one part in a hundred million.

In accordance with the present invention, the two signals to be compared are converted to pulses of corresponding amplitude which are alternately switched to a network to produce an A. C. output signal whose amplitude corresponds with the differential amplitude of the pulses of successive pairs and whose phase depends upon which of them is the greater. The alternate half-waves of the A. C. signal are suppressed by periodically shunting the network output by a linear symmetric conductor so to provide a D. C. signal of amplitude corresponding with their differential amplitude and of reversible polarity dependent upon which of them is the greater. By this method, the contact potential error is very greatly reduced—of the order of 250,000 times.

In one arrangement suited to perform the new method the two D. C. signals to be compared are respectively continuously supplied to tubes which are alternately gated, in another where the signals to be compared are A. C. they are, before application to the gating tubes, first applied to detectors in which the rectified output is proportional to the A. C. input, and in still another arrangement the output of the gated tubes includes a separate single rectifier in their common output circuit. In all cases the square wave A. C. component of the common output of the gated tubes, or of the single detector output, is used to produce a D. C. output voltage by suppressing alternate half-waves by a mechanical comparator switch operating in synchronism with the gating. In such arrangements, the gating of the tubes may be effected by a gating-signal generator including a tube whose input circuit includes a second mechanical switch operating in synchronism with the comparator switch. In other arrangements embodying the invention, all tubes are omitted and the second mechanical switch effects gating by alternately connecting the sources of the two signals to be compared to a rectifier network synchronously shunted by the comparator switch.

In a preferred form of the invention, a single-pole, double-throw switch periodically operated as by an A. C. excited electromagnet serves both as the comparator switch and as a switch producing the input signal of a gating generator.

The invention further resides in systems having novel and useful features of combination and arrangement hereinafter described and claimed.

Some of the features disclosed in the instant application were disclosed but not specifically claimed per se in my copending application Serial No. 228,921 filed May 29, 1951.

For a more detailed understanding of the invention and for illustration of comparator methods and systems embodying it, reference is made to the accompanying drawings, in which:

Fig. 1 schematically illustrates a comparator system using one form of synchronous mechanical switch;

Figs. 2A–2E, 3A–3C and 4A–4C are explanatory figures referred to in discussion of Fig. 1 and other figures;

Figure 5:
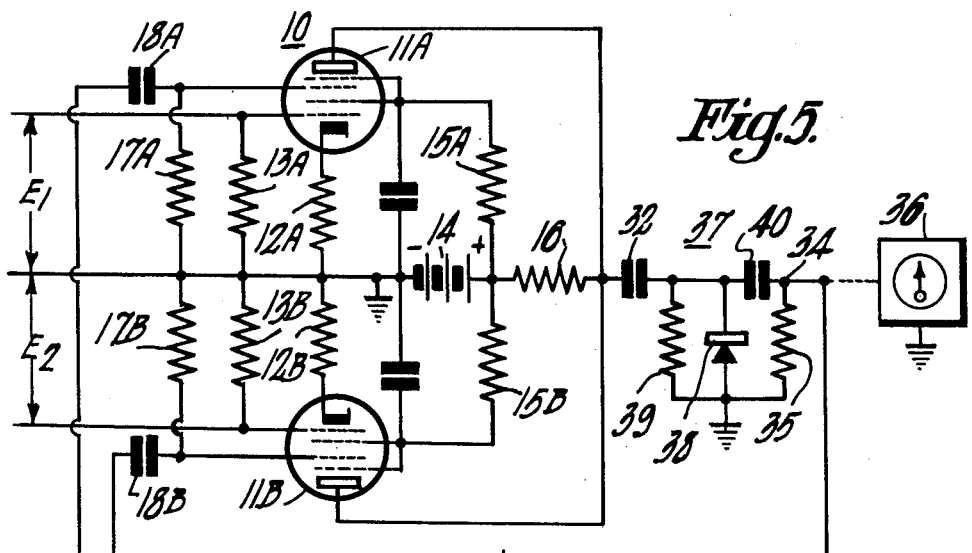
Fig. 5 is a modification of Fig. 1 utilizing a single detector.
Figure 6:
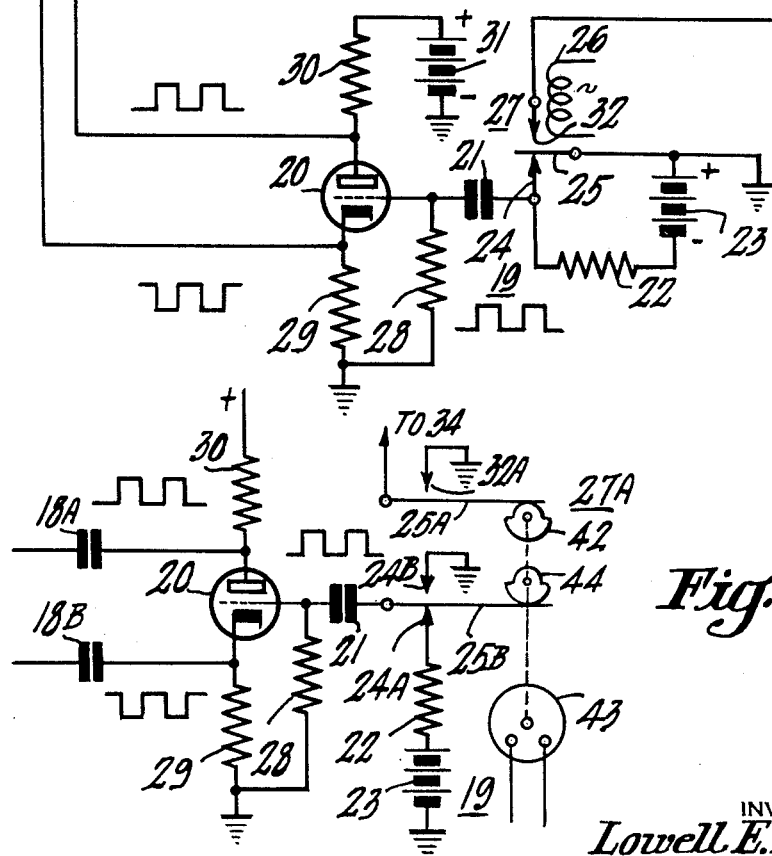
Figure 7:
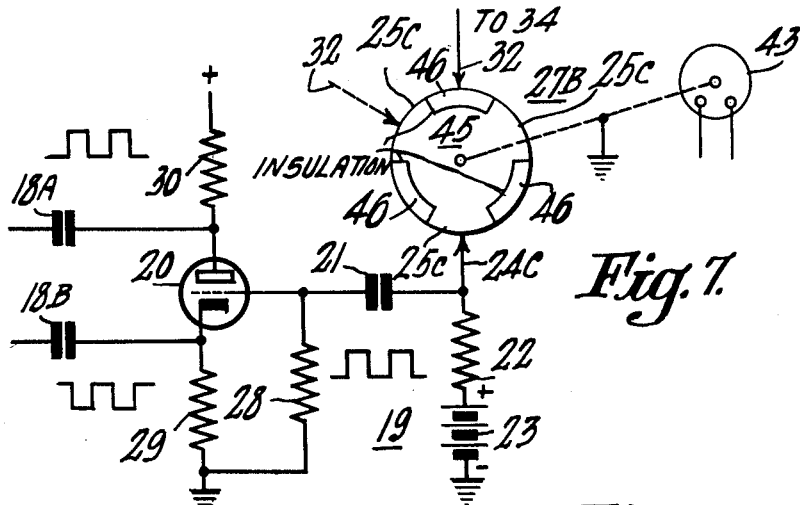
Figure 8:
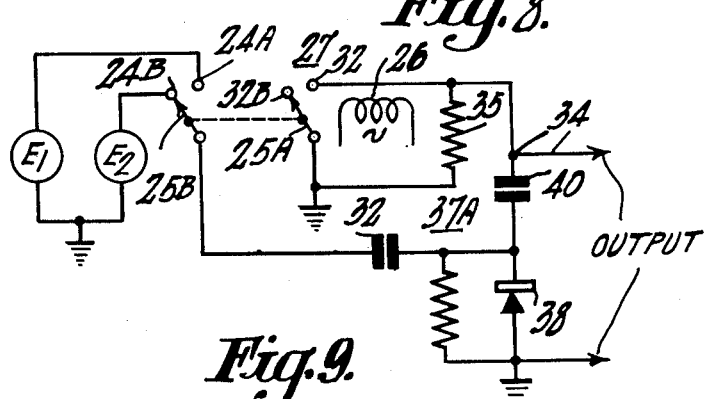
Figure 9:
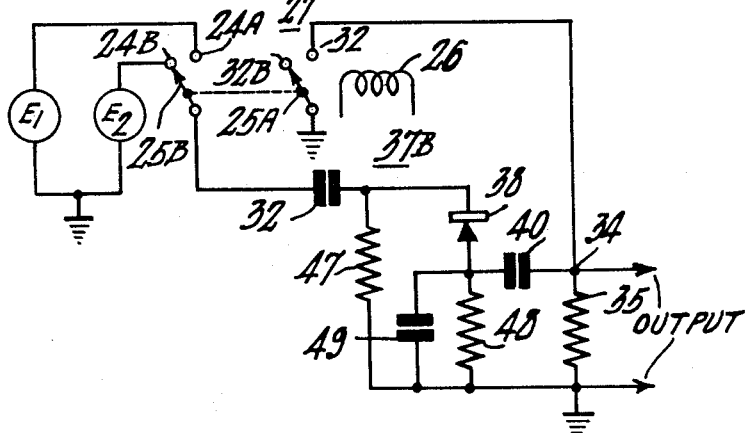

Figs. 6 and 7 illustrate other forms of synchronous mechanical switches utilizable in the systems of Figs. 1 and 5; and Figs. 8 and 9 illustrate additional modifications of the invention.

Referring to Fig. 1 as exemplary of a comparator system characterized by extremely low errors due to contact potentials, the D. C. signals $E_1$ and $E_2$ to be compared are applied to two signal channels of the gated amplifier 10. If the potentials to be compared are A. C. they are first applied to detectors 8A and 8B in which the outputs are proportional to the A. C. inputs. These two detector outputs are then utilized as the two $E_1$, $E_2$ inputs of Fig. 1. More specifically, these signals are respectively applied to grids of the amplifier tubes 11A, 11B. Biasing potentials for these grids may be provided by the cathode biasing resistors 12A, 12B respectively connected between the cathodes of the tubes 11A, 11B and ground and are applied to the grids through the input resistors 13A, 13B.

The operating voltage of the anodes and of other grids of the tubes are provided by a suitable direct-current source exemplified by battery 14: specifically, the Nos. 2 and 4 grids of tubes 11A, 11B are connected to the positive terminal of source 14 by the similar dropping resistors 15A, 15B respectively, and the anodes of the tubes are connected through similar load resistors or inductances 16A, 16B to the same point.

The No. 3 grids of the tubes 11A, 11B, in the absence of gating signals, are at ground potential, being connected to ground through the similar resistors 17A, 17B respectively. Thus in absence of gating signals, there is normal conduction of anode current by either tube during application of the signal voltages $E_1$, $E_2$.

The No. 3 grids of the tubes 11A, 11B are respectively coupled through the capacitors 18A, 18B to the output terminals of a gating-signal generator 19 which provides gating pulses $P_A$, $P_B$ so phased that alternate gating of tubes 11A, 11B is effected. As indicated by Figs. 2A and 2B, the tube 11A is periodically conductive for intervals A during which the tube 11B is nonconductive and conversely the tube 11B is periodically conductive for periods 11B during which the tube 11A is nonconductive.

In the particular arrangement shown in Fig. 1, the gating signal generator 19 includes a triode 20 whose grid is connected by a capacitor 21 and a high resistance 22 to a direct-current source exemplified by battery 23. The common lead for capacitor 21, resistor 22 is connected to contact 24 intermittently engaged by a movable contact 25 connected to the other terminal of battery 23 and ground. The movable contact 25 is actuated periodically to engage contact 24 as by solenoid 26 energized from a suitable source of alternating current.

The periodic engagement and separation of contacts 24, 25 produces a square wave potential at the junction of capacitance 21 and resistance 22 with respect to ground. The capacitance 21 applies the A. C. component of this square wave so as to apply a square wave P to the grid of tube 20. The magnitude of resistor 22 should be suitably high to limit the current drawn from source 23 when contacts 24, 25 are in engagement; and the time constant of the RC combination 22, 28, 21 should be greater than the period of the switching.

The D.-C. operating potential of the grid of tube 20 may be derived from resistor 29 connected between cathode and ground, the grid of the tube being connected to ground through grid resistor 28.

The anode of tube 20 is connected through resistor 30 to a suitable source of direct current exemplified by battery 31. The resistors 29 and 30 traversed by the anode current of tube 20 are of high and substantially equal value, so that with the output connections shown the application to the grid of the tube of a square wave voltage P produces in the output circuits of the tube square wave gating signals $P_A$, $P_B$ which are 180° out of phase and so suited for alternate gating of tubes 11A, 11B. The tube 20 thus serves as a push-pull inverter for the input gating signal P.

When the signal voltages $E_1$, $E_2$ to be compared are of equal amplitude, the anode-current pulses $S_A$ (Fig. 2C) of gated tube 11A are equal to the output-current pulses $S_B$ of the tube 11B. When, however, the amplitude of signal $E_1$ is greater than the amplitude of signal $E_2$, the output pulses $S_A$ of tube 11A are correspondingly greater than the output pulses of tube 11B as shown, for example, in Fig. 2D. If, on the other hand, the signal $E_2$ is the greater in amplitude, the output pulses $S_A$ of tube 11A are smaller than the output pulses $S_B$ of tube 11B as shown in Fig. 2E.

As shown by Figs. 2C–2E when the signals $E_1$, $E_2$ are of equal amplitude, the combined anode currents of the two tubes has no A.-C. component: when, however, the signals $E_1$, $E_2$ are of unequal amplitude, the combined plate currents of the tubes has an A.-C. component of gating frequency whose amplitude depends upon the difference between the signal amplitudes and whose phasing depends upon which of the signals is the greater. To separate this A.-C. component, the anodes of the tubes are connected by blocking condensers 32A, 32B to equal output resistors 33A, 33B whose common terminal 34 is connected through a common output load exemplified by resistor 35 to ground. The resistors 33A, 33B, 35 form a network for combining the outputs of tubes 11A, 11B and without appreciable interaction provided the resistance of resistors 33A, 33B is large compared to the resistance of resistor 35.

Thus in the system as thus far described, when the signals $E_1$, $E_2$ are of equal amplitude, there is no flow of gating frequency current through resistor 35 (Fig. 3A); when the signal amplitudes are unequal, the resistor 35 is traversed by a gating frequency current (Figs. 3B, 3C) whose amplitude depends upon the relative amplitude of the signals $E_1$ and $E_2$ and whose phasing depends upon which is the greater. So far this alternating component is concerned, the junction of anode resistors 16A, 16B, or equivalent, is at ground potential and resistor 35 is effectively connected between that junction and junction 34 of resistors 33A, 33B.

Conversion of this alternating signal ($S_1$ of Fig. 3B or $S_2$ of Fig. 3C) to a unidirectional current of reversible polarity, depending upon which of the signals $E_1$, $E_2$ is the greater, is effected by a mechanical sampling or comparator switch 27 which operates in synchronism with the gating signals $P_A$, $P_B$ periodically to suppress either the positive or negative half-waves of the output signal $S_1$ or $S_2$.

In the particular arrangement shown in Fig. 1, the switch 27 is so phased and connected that it shunts or short-circuits the load 35 during the half-wave intervals of the gating frequency for which the tube 11B is conductive. Thus, as shown in Figs. 3B and 4B, when signal $E_1$ is the greater, the load 35 is traversed by positive current impulses $P_1$, whereas when the signal $E_2$ is the greater, the load resistor 35 is traversed by negative impulses $P_2$, and when $E_1 = E_2$ the output across resistance 35 is zero. In all cases, the magnitude of the pulses corresponds with the differential amplitude of the impressed signals $E_1$, $E_2$. The current through resistor 35 (and the voltage drop across it) is therefore representative both in amplitude and sense of the relative amplitudes of signals $E_1$, $E_2$ and may be used for indicating, recording or control purposes.

In the particular arrangement shown in Fig. 1, this mechanical switching in the output circuit of the comparator is effected by connecting the ungrounded terminal of the load 35 to fixed contact 32 intermittently engaged by the movable grounded contact 25 of the gating signal generator 19. By so using a single-pole double-throw switch both for producing the gating signal and for suppressing selected half-waves of the output of gated amplifier 10, all synchronizing problems are avoided.

With such mechanical switching arrangement, the measured contact potential is very low—of the order of $10^{-6}$ volts—in contrast to the 0.25 volt differential contact potential obtainable in prior arrangements only by most careful selection of tubes. Consequently, with the mechanical switching arrangement, the error is only $10^{-7}$ instead of $2.5 \times 10^{-2}$: an improvement of 250,000 times. The single mechanical comparator switch replaces one or two pairs of tubes and unlike tubes provides a linear output over an extremely wide voltage range: in brief, the mechanical comparator switch is a linear, symmetric conductor whereas an electronic tube is a non-linear, asymmetric conductor.

Although this comparator is of general application for comparison of signal amplitudes, it is particularly suited for use in systems employing spectral lines of gases as standards of frequency or time such as disclosed in copending applications including Serial Nos. 228,921 and 198,541.

The modification shown in Fig. 5 may be used with either D.-C. or A.-C. comparison voltages $E_1$, $E_2$ and is generally similar to that shown in Fig. 1, with all common components being identified by the same reference characters. In the arrangement shown in Fig. 5, only one detector, driven from the joint output of the two tubes 11A, 11B, is used. The A.-C. component of the detector envelope output becomes signal $S_1$ or $S_2$ (Figs. 3B, 3C). Specifically in Fig. 5, the anode load resistor or inductance 16 is common to the anode circuits of both gated tubes 11A, 11B and the plate terminal of this resistor is coupled by blocking condenser 32 to the rectifier network 37 which in the particular form illustrated includes crystal diode 38, shunting resistor 39 and RC network 40, 35 of which the resistor 35 is the output resistor or load. As in Fig. 1, the D.-C. potential difference between the output terminal 34 and ground may be applied to an indicating, recording or control device generically represented by block 36.

In the particular arrangements shown in Figs. 1 and 5, a vibratory single-pole double-throw switch is used both to provide the square wave input for the tube 20 of gating signal generator 19 and also synchronously to rectify the the A.-C. component of square wave output $S_1$, $S_2$ of the gated tubes 11A, 11B. Other synchronous mechanical switches may also be used in attainment of extremely low contact potentials for precise comparison of the amplitudes of signals $E_1$, $E_2$.

For example, in the particular arrangement shown in Fig. 6, the switch 27A for periodically shunting the output of the comparator comprises contacts 32A, 25A respectively connected to ground and to output terminal 34 of the comparator. One of the contacts, specifically contact 25A, is actuated by a cam 42 driven by a suitable motor 43. A second cam 44, also operated by motor 43, effects movement of a second movable contact 25B connected through capacitor 21 to the grid of tube 20. Under control of cam 44, the contact 25B alternately engages the contacts 24A, 24B respectively connected to resistor 22 of the capacitor-charging circuit and 24B connected to ground. The cams 42, 44 are so angularly disposed or phased that the contacts 25A, 32A of switch 27A are closed when a selected one or the other of tubes 11A, 11B is conductive. This switching arrangement may be used in the systems of Figs. 1 and 5 in replacement of the mechanical switches therein shown to perform the method of comparison exemplified by Figs. 2A–4C.

Another synchronous mechanical switch suited for use in the comparator systems of Figs. 1 and 5 in attainment of extremely low errors due to contact potentials, is exemplified in Fig. 7. In this arrangement, a commutator disc 45, driven by a suitable motor 43, has a series of grounded sectors 25C alternating with insulating sectors 46. During the intervals for which the contact 24C is in engagement with an insulating sector 46, the potential at the junction of capacitance 21 and resistance 22 is a maximum, while it is zero with respect to ground when the contact 24C is engaged by the next conductive sector 25C of commutator 45. The grid of tube 20 is therefore subjected to the gating signal P to produce the push-pull gating pulses $P_A$, $P_B$ for alternating gating of tubes 11A, 11B of Figs. 1 and 5.

The insulating and conductive sectors of commutator 45 also successively engage the contact 32 connected to output terminal 34 of the comparator network intermittently to shunt the output resistor of the comparator 35 in synchronism with the gating signals so to convert the A.-C. output of the comparator to a unidirectional current of reversible polarity in dependence upon which of the input signals $E_1$, $E_2$ is the greater. From the preceding description of Fig. 1 and Figs. 2A–4C, it is believed the operation of a system including the mechanical switch of Fig. 7 in replacement of the mechanical switch of Figs. 1 or 5 is abundantly clear.

In any of Figs. 1, 5, 6 and 7, the relation between the polarity of the output signal and the greater of input signals $E_1$, $E_2$ may be reversed in various ways as by transposing the gating signal connections to tubes 11A, 11B. Additionally in Figs. 6 and 7, such relation may be mechanically reversed; in Fig. 6, by suitably shifting the relative positions of cams 42, 44 and in Fig. 7, by suitably shifting the relative positions of contacts 24C, 32.

In the preceding modifications, the gated tubes 11A, 11B in effect serve as electronic switches for alternately connecting, at gating frequency, the sources of voltages $E_1$, $E_2$ to a rectifier network whose output is synchronously shunted by a mechanical switch 27. Also, in the preceding modifications, the gating of tubes 11A, 11B is effected by a gating signal generator including tube 20 and a second mechanical switch operated in unison with switch 27. In the modifications shown in Figs. 8 and 9, the tubes 11A, 11B and 20 are omitted and the second mechanical switch used alternately to connect the voltages $E_1$, $E_2$ to the rectifier network.

Specifically, in Fig. 8, the input coupling condenser 32 of rectifier network 37A is connected to contact 25B of a single-pole double-throw switch operated at desired gating frequency as by the A. C. energized electromagnet 26. The gating frequency may conveniently be 60 cycles, 120 cycles or other power line frequency or harmonic thereof; depending upon the particular application and required sampling rate. The fixed contacts 24A, 24B of the switch are connected to sources $E_1$, $E_2$ so that the rectifier input, as shown in Figs. 2C–2E, is a series of pulses A, B of equal or unequal magnitude. The A. C. component of the gating frequency output of the rectifier network 37A, as shown by Figs. 3A–3C, is zero when the voltages $E_1$, $E_2$ are equal and when the voltages are unequal is of phase dependent upon which is the greater of the voltages $E_1$, $E_2$. However, as the rectifier output is synchronously shunted by the switch 27 whose contacts 25A, 32 are respectively connected to ground and to point 34 of the output circuit, the rectifier output as passed on to an indicating, recording or control device or circuit is a unidirectional voltage or current whose polarity depends upon which of voltages $E_1$, $E_2$ is the greater (Figs. 4B, 4C) and which is zero when $E_1$, $E_2$ are equal.

The modification shown in Fig. 9 is the same as that of Fig. 8 except for differences in the rectifier network. In Fig. 9, the rectifier 38 is in series between input coupling capacitor 32 and the ungrounded output terminal 34. In the series rectifier network 37B of Fig. 9, the magnitude of the shunt input impedance 47 should be high, at the gating frequency, compared to the magnitude of impedance 48 connected between rectifier 38 and ground so that most of the output appears across 48. The capacitor 49 is used when the potentials $E_1$, $E_2$ are of radio-frequency or intermediate frequency to by-pass or filter out such higher frequency components of the pulses A, B: it may be omitted when the potentials $E_1$, $E_2$ are continuous or pulsed D. C. potentials. This same rectifier network may be used in other systems, such as Fig. 5, for example.

In Figs. 8 and 9, the relation between the polarity of the output signal and the greater of input signals $E_1$, $E_2$ may most simply be reversed by shifting the connection from point 34 from contact 32 of switch 27 to contact 32B thereof.

In all modifications, the actual contacts of the contact members of the comparator switch 27 should either be of the same metal, pure or alloy, such as platinum, silver, etc. or of metals which are very close in the electromotive series. Also when, as in Figs. 8 and 9, the gating switching means is entirely mechanical, its actual contacts should be of the same metal in avoidance of introduction of spurious potentials.

What is claimed is:

1. An arrangement for the precise comparison of the amplitudes of two signals comprising, a network having separate connection means to which said two signals are applied, a mechanical switch having a contact movable between two fixed contacts, means coupled to one of said fixed contacts and to said movable contact for generating and applying gating signals to said network to produce at the output of said network an alternating-current signal whose amplitude corresponds with the differential amplitude of said two signals and whose phase is dependent upon which of them is the greater, and means for coupling the other of said fixed contacts to the output of said network to suppress alternate half-waves of said alternating current to produce a unidirectional signal of amplitude corresponding with the relative amplitude of the compared signals and of reversible polarity dependent upon which of them is the greater.

2. An arrangement as in claim 1 in which said network includes electronic tubes to which the two signals to be compared are respectively continuously applied and which are alternately gated by signals from said gating means.

3. An arrangement as in claim 1 in which said applied signals are alternating potentials, and means for rectifying said applied signals prior to their application to said network.

4. An arrangement as in claim 1 in which the input portion of said network comprises two amplifier channels alternately gated by signals from said gating means and to which the two signals to be compared are respectively continuously applied.

5. An arrangement as in claim 1 in which the gating means includes a tube whose input circuit includes said one fixed contact for production of gating signals, and in which the two signals to be compared are respectively continuously applied to tubes alternately gated by said signals.

6. An arrangement for the precise comparison of the amplitudes of two signals comprising, separate connection means for sources for providing said two signals, an amplitude comparison network, a mechanical switch including a first portion for alternately applying said two signals to said network to produce at the output of said network an alternating-current signal whose amplitude corresponds with the differential amplitude of said two signals and whose phase is dependent upon which of them is the greater, and a second portion of said mechanical switch for suppressing alternate half-waves of said alternating-current signal to produce an unidirectional signal of amplitude corresponding with the relative amplitude of the compared signals and of reversible polarity dependent upon which of them is the greater.

7. An arrangement as claimed in claim 6 including indicator means coupled to said network for providing an indication proportional to the amplitude of said unidirectional signal.

References Cited in the file of this patent
UNITED STATES PATENTS

| | | |
|---|---|---|
| 2,345,668 | Hallmark | Apr. 4, 1944 |
| 2,404,306 | Luck | July 16, 1946 |
| 2,464,353 | Smith | Mar. 15, 1949 |
| 2,471,252 | Toulon | May 24, 1949 |
| 2,485,948 | Williams | Oct. 25, 1949 |
| 2,487,010 | Wild | Nov. 1, 1949 |
| 2,503,085 | Williams | Apr. 4, 1950 |
| 2,512,702 | White | June 27, 1950 |
| 2,595,754 | Bedford | May 6, 1952 |